US006969485B2

(12) United States Patent
Vorenkamp et al.

(10) Patent No.: US 6,969,485 B2
(45) Date of Patent: Nov. 29, 2005

(54) HIGH VOLUME PRODUCTION OF LOW PERMEATION PLASTIC FUEL TANKS USING PARALLEL OFFSET TWINSHEET PRESSURE FORMING

(75) Inventors: Erich James Vorenkamp, Pinckney, MI (US); Barbara Krell, Frechen (DE); Lawrence Eugene Vaughn, III, Canton, MI (US); Larry Dean Land, Grosse Ile, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 512 days.

(21) Appl. No.: 09/922,059

(22) Filed: Aug. 3, 2001

(65) Prior Publication Data

US 2002/0017745 A1 Feb. 14, 2002

Related U.S. Application Data

(60) Provisional application No. 60/224,487, filed on Aug. 11, 2000.

(51) Int. Cl.⁷ .............................................. B29C 51/42
(52) U.S. Cl. ................... 264/545; 264/250; 264/492; 264/571; 264/DIG. 65; 156/245; 156/304.2; 156/322
(58) Field of Search ................... 156/242, 245, 156/292, 304.2, 308.2, 309.6, 322; 264/492, 264/545, 571, 248, 250, DIG. 65, DIG. 76

(56) References Cited

U.S. PATENT DOCUMENTS

| | | | |
|---|---|---|---|
| 3,462,330 A | 8/1969 | Greig et al. | |
| 3,647,335 A * | 3/1972 | Brown, Jr. | 425/143 |
| 4,431,404 A * | 2/1984 | Cobb et al. | 432/11 |
| 4,452,943 A * | 6/1984 | Goldman | 525/105 |
| 4,790,972 A * | 12/1988 | Coffman | 264/152 |
| 5,129,544 A | 7/1992 | Jacobson et al. | |
| 5,142,843 A | 9/1992 | Reil et al. | |
| 5,389,177 A * | 2/1995 | Shuert | 156/245 |
| 5,843,366 A * | 12/1998 | Shuert | 264/545 |
| 5,961,914 A * | 10/1999 | Mannion et al. | 264/544 |
| 6,039,101 A | 3/2000 | MacKinnon | |
| 6,294,114 B1 * | 9/2001 | Muirhead | 264/40.6 |
| 6,328,842 B1 * | 12/2001 | Coninck et al. | 156/304.2 |
| 6,372,176 B1 * | 4/2002 | Ekendahl et al. | 264/545 |
| 6,379,606 B1 * | 4/2002 | Chun et al. | 264/545 |

FOREIGN PATENT DOCUMENTS

| | | | |
|---|---|---|---|
| BE | 885162 A | * | 12/1980 |
| DE | 26 00 582 | | 7/1977 |
| GB | 1160779 | | 8/1969 |
| GB | 1242509 | | 8/1971 |
| GB | 1410215 | | 10/1975 |

OTHER PUBLICATIONS

U.S. Appl. No. 09/921,541, Low Hydrocarbon Emision Fuel Tank with Internal Components, Erich James Vorenkamp, et al, filed Aug. 3, 2001.
U.S. Appl. No. 09/921,607, Adapter for Welding Objects to Plastic, Erich James Vorenkamp, et al., filed Aug. 3, 2001.

* cited by examiner

*Primary Examiner*—Melvin Mayes
(74) *Attorney, Agent, or Firm*—Brinks Hofer Gilson & Lione (57) ABSTRACT

Processes are disclosed for producing plastic containers from thermoplastic sheets where the thermoplastic sheets are processed in parallel to form a low permeation plastic container. A plurality of thermoplastic sheets are progressively heated to a first temperature in a pre-conditioning stage. A group of the thermoplastic sheets are selected from the plurality of thermoplastic sheets and rapidly heated to a second temperature in a final heat stage. The group of thermoplastic sheets are then processed in a forming stage to form the low permeation plastic container.

20 Claims, 3 Drawing Sheets

HIGH VOLUME PRODUCTION OF LOW PERMEATION PLASTIC FUEL TANKS USING PARALLEL OFFSET TWINSHEET PRESSURE FORMING

This application claims the benefit under 35 U.S.C. §119(e) of Provisional U.S. patent application Ser. No. 60/224,487 filed on Aug. 11, 2000.

BACKGROUND

1. Field of the Invention

This invention relates to production of plastic fuel tanks, and more particularly to a process and system for manufacturing plastic fuel tanks using twin sheet thermoforming.

2. Description of the Related Art

Fuel tanks made of plastic are well known for providing a reservoir of fuel for engines and other fuel consuming devices in land, water and air vehicles. Use of plastic fuel tanks provides a lightweight yet durable fuel tank that is corrosion resistant. In addition, plastic fuel tanks can be economically formed into complex shapes to optimally fit within available space within a vehicle.

Plastic fuel tanks are typically produced with a blow molding technique using high-density polyethylene (HDPE) plastic in monolayer or coextruded form. The plastic typically includes a hydrocarbon barrier to prevent passage of fuel and associated vapors there through. During the blow molding process, hollow cylindrical plastic in a molten or softened state is extruded into a mold. The mold includes an interior hollow area defined by a mold surface. Pressurized fluid is fed into the hollow cylindrical plastic to move the plastic into contact with the mold surface. Once the plastic is formed to the mold surface, the mold is opened and the plastic formed in the shape of a fuel tank is removed.

Additional components are usually added to the fuel tank to create a fuel system. The components may include valves, hoses, pumps, level sensors, structural supports, etc. Typically, in fuel tanks formed by blow molding techniques some of these components are installed inside the fuel tank by cutting service holes in the tank. In addition, some of the components are installed outside the tank requiring additional holes, grooves and/or recesses.

Recent changes in government regulations have reduced the amount of allowable fuel vapor emissions from fuel tanks. One way to reduce allowable fuel vapor emissions is through minimization of breaches in the hydrocarbon barrier. Reduction in the number of holes in the fuel tank through internalization of the fuel system components minimizes breaches. One way to internalize the fuel system components is to insert the components during manufacture of the fuel tank.

In plastic fuel tanks manufactured with the blow molding process however, such internalization is not easily achieved. Accessibility to the interior of the fuel tank during the forming process is through relatively small openings making placement difficult. In addition, fuel system components in an extremely compact form may be required to fit through such openings.

Another technique for creating plastic containers uses twinsheet thermoforming. Twinsheet thermoforming techniques are typically performed with a rotary thermoforming machine. In a rotary thermoforming machine, previously extruded thermoplastic sheets are sequentially indexed through stations during processing. Each thermoplastic sheet is individually loaded into the machine at a first station. The thermoplastic sheet is sequentially indexed to a second and third station for heating to a molten or softened state. A sheet emerging from the third station is conformed to the contour of a first mold. The next sheet emerging from the third station is conformed to a second mold. The first and second molds provide the two halves of the plastic container that may then be joined.

Although twinsheet thermoforming with conventional rotary machines is conducive to internalizing fuel system components within the first and second molds, known inefficiencies make the technique unsuitable for high volume production of plastic fuel tanks.

One inefficiency is a result of the length of processing time. Significant processing time is required to heat the sheets to the desired processing temperature. Heating throughout the thickness of the sheets usually occurs gradually to raise the temperature of the sheets without burning or otherwise damaging the thermoplastic. In addition, lag time associated with sequential processing of each sheet adds to the overall processing time. Another inefficiency is the heat loss, and resulting process variations, in a previously heated thermoplastic sheet while awaiting the heating of a subsequently heated thermoplastic sheet. Accordingly, a process and system is needed that can provide efficient high volume production of plastic fuel tanks while allowing internalization of fuel system components.

BRIEF SUMMARY

The present invention is defined by the following claims, and nothing in this section should be taken as a limitation on those claims. By way of introduction, the embodiments described below include a method and system for high volume, high efficiency manufacturing of low permeation plastic fuel tanks. The method and system minimizes lag time and heat loss inefficiencies while allowing the internalization of fuel system components by utilizing parallel offset twin sheet pressure forming with a twin sheet parallel processing system.

The twin sheet parallel processing system includes at least one loading stage, at least one pre-conditioning stage, at least one final heat stage, at least one forming stage and an offloading stage. Thermoplastic sheets are used in the twin sheet parallel processing system to form the low permeation plastic fuel tanks. The thermoplastic sheets possess properties that allow compliance with safety regulations for fuel tanks as well as minimizing penetration of hydrocarbons therethrough. High volume production of low permeation plastic fuel tanks involves placing a plurality of thermoplastic sheets in the loading stage. The thermo plastic sheets are transferred to the pre-conditioning stage.

Within the pre-conditioning stage, the thermoplastic sheets are progressively heated to a first temperature that is a pre-processing temperature. From the plurality of thermoplastic sheets, a group of thermoplastic sheets at the pre-processing temperature is removed. The group of thermoplastic sheets is rapidly heated in a final heat stage. Heating in the final heat stage is to a second temperature that is a processing temperature. The group of thermoplastic sheets is then indexed to a forming stage and shaped to form a container.

Processing groups of thermoplastic sheets within the final heat stage and the forming stage occurs significantly faster than heating the thermoplastic sheets within the pre-conditioning stage. High volume and efficient production is achieved by progressively heating the thermoplastic sheets in the pre-conditioning stage such that groups of thermoplastic sheets at the pre-processing temperature are always available for the final heat stage and the forming stage.

Efficiency in production of low permeation plastic fuel tanks is a result of reductions in processing time and reductions in energy consumption. Processing time reductions are achieved through parallel processing of each of the thermoplastic sheets within the group of thermoplastic sheets. In addition, heating the groups of thermoplastic sheets to the pre-processing temperature allows for rapid temperature increase to the processing temperature without damage.

An interesting feature of the twin sheet parallel processing system is the capability to pressurize a cavity formed when the group of thermoplastic sheets is fused. The cavity is pressurized during the forming process to further urge the group of thermoplastic sheets into the desired formation.

Another interesting feature of the twin sheet parallel processing system is the capability to couple objects with at least one thermoplastic sheet within the group of thermoplastic sheets during the forming process. The coupling location results in the object(s) being internally mounted when the low permeation plastic fuel tank is completely formed.

Yet another interesting feature of the twin sheet parallel processing system is the capability to fuse the group of thermoplastic sheets to form the low permeation plastic fuel tank. The fusing of the group of thermoplastic sheets occurs within the forming stage. A pinch off region that is a hermetic seal is formed during the fusing. The hermetic seal provides a barrier to hydrocarbon vapors.

Further aspects and advantages of the invention are discussed below in conjunction with the preferred embodiments.

DETAILED DESCRIPTION OF THE PREFERRED EMBODIMENTS

Figure 1:
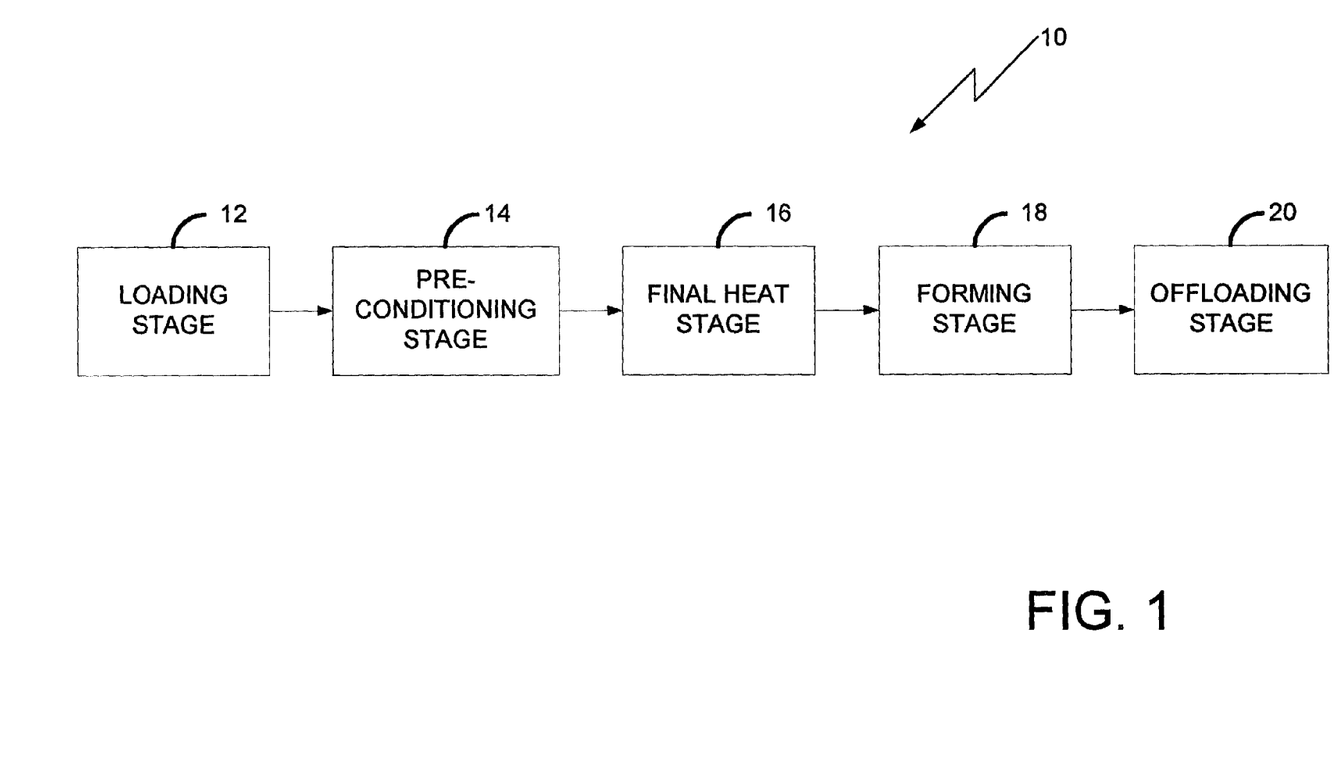
FIG. 1 is a block diagram of one embodiment of a twin sheet parallel processing system.

FIG. 1 illustrates a block diagram of one embodiment of a twin sheet parallel processing system 10. The twin sheet parallel processing system 10 includes a loading stage 12, a pre-conditioning stage 14, a final heat stage 16, a forming stage 18 and an offloading stage 20 operatively cooperating as illustrated. The identification of stages within the twin sheet parallel processing system 10 is illustrative of the functional aspects of the system, additional or fewer stages may be used to identify the functional aspects in other embodiments. The twin sheet parallel processing system 10 is capable of efficient, high volume, production of plastic containers.

The plastic containers are preferably formed from thermoplastic sheets. As used herein, the term thermoplastic sheet refers to synthetic resins formed to have two relatively flat opposing surfaces. The thickness of the synthetic resin between the opposing surfaces is thin in comparison to the length and/or the width of the opposing surfaces. Thermoplastic sheets may be formed by monolayer, coextrusion or composite laminate techniques. Accordingly, each thermoplastic sheet may be formed of a single layer of synthetic resin or may include a plurality of layers.

The presently preferred embodiments perform efficient, high volume, production of low permeation plastic fuel tanks. Safety and performance standards associated with plastic fuel tanks establish the specifications and characteristics of the thermoplastic sheets. Exemplary safety and performance standards include burst resistance, impact resistance and burn through resistance.

Compliance with the standards results in the thermoplastic sheets being a relatively thick and robust material. The robustness of the thermoplastic sheets may add significant rigidity and stiffness. The rigidity and stiffness makes thermoforming of the thermoplastic sheets difficult. In addition, the low thermal conductivity of thermoplastic makes heating the thermoplastic sheets without damage a relatively slow process. Further, significant sensitivities to temperature may be exhibited within the thickness of the sheet. The sensitivities may be manifested in viscosity variations that make processing the thermoplastic sheets difficult.

Achieving and maintaining the temperature of the thermoplastic sheet is an important component to successful thermoforming as well as compliance with the standards. In addition, uniformity of temperature across and through the sheet, as well as similarity in the temperature of different thermoplastic sheets, is equally important to minimizing variations. If, for example, a warm thermoplastic sheet (e.g. room temperature) is processed with a cold thermoplastic sheet (e.g. unheated storage temperature), a significant variation in the process could occur resulting in non-complying containers. In addition, where the thermoplastic sheet includes multiple layers, uniform and thorough heating is important.

Accordingly, prior art thermoforming techniques have not successfully achieved high volume, high efficiency production using thermoplastic sheets capable of meeting the safety and performance standards for low permeation plastic fuel tanks.

In one embodiment, each of the thermoplastic sheets includes six layers. The first layer is an outer layer that includes high-density polyethylene (HDPE) and carbon black. The second layer is an inner layer positioned adjacent to the first layer and includes reground thermoplastic sheet material. A third layer, positioned adjacent the second layer, is also an inner layer and includes adhesive polymer. Positioned adjacent the third layer is a fourth layer that includes ethylene vinyl alcohol (EVOH). The EVOH layer of this embodiment provides a hydrocarbon barrier for reduction of the emission of hydrocarbons permeating through the thermoplastic sheet. A fifth layer is positioned adjacent the fourth layer and includes adhesive polymer. The sixth layer forms the other outer layer adjacent to the fifth layer and includes HDPE. In other embodiments, different compositions, arrangements and quantities of layers may be used to form the thermoplastic sheet.

Referring again to FIG. 1, the loading stage 12 is a receiving point for a plurality of thermoplastic sheets. As used herein, the term "plurality of thermoplastic sheets" or "thermoplastic sheets" is defined to be any quantity of individual thermoplastic sheets up to an infinite number of thermoplastic sheets. In one embodiment, the loading stage 12 receives the thermoplastic sheets and includes an automated mechanism to shuttle the thermoplastic sheets to the pre-conditioning stage 14. The thermoplastic sheets may be received in the form of bundles, pallets, reams or directly from the extrusion process forming the thermoplastic sheets.

The pre-conditioning stage 14 may be any mechanism or device capable of raising the temperature of a plurality of thermoplastic sheets to a first temperature that is a pre-processing temperature. In one embodiment, the thermoplastic sheets are pre-conditioned in a convection oven. The convection oven provides blowing heat to heat-soak the thermoplastic sheets and raise the temperature of each of the sheets slowly and uniformly.

In this embodiment, the pre-conditioning stage 14 is a progressive multi-stage heat soak oven operating to provide continuous throughput. The progressive multi-stage heat soak oven increases the temperature of thermoplastics sheets placed therein. In addition, the oven provides for continuous insertion of additional thermoplastic sheets and removal of thermoplastic sheets progressively heated to the pre-processing temperature. In other embodiments, other heating mechanisms and techniques may be utilized to provide a continuous heating process such that some of the thermoplastic sheets within the pre-conditioning stage 14 are at the pre-processing temperature while other thermoplastic sheets are being progressively heated.

The pre-processing temperature may be any temperature less than the melt temperature of the thermoplastic sheets. Preferably, the pre-processing temperature is the maximum temperature at which the thermoplastic sheets may be handled and manipulated without damage. In one embodiment, the preprocessing temperature is between about 88 and 110 degrees Celsius.

Control of the pre-conditioning stage 14 to achieve and maintain the pre-processing temperature may be by, for example, a temperature control circuit, a timing circuit, temperature profiling or any other control technique for realizing a uniform temperature for the thermoplastic sheets. Heating the thermoplastic sheets to the pre-processing temperature within the pre-conditioning stage 14 takes a significant amount of time. To maintain continuous, high volume operation, the pre-conditioning stage 14 is preferably capable of progressively heating sufficient quantities of the thermoplastic sheets to continuously provide thermoplastic sheets, at the pre-processing temperature, to the final heat stage 16.

The final heat stage 16 may be any mechanism or device capable of rapidly raising the temperature of a group of thermoplastic sheets to a second temperature that is a processing temperature. In one embodiment, where the thermoplastic sheets are multi-layered, the final heater stage elevates the temperature to ensure that temperature sensitive material properties of all layers, such as, for example, viscosity are repeatably elevated to the processing temperature. Exemplary processing stages 16 include one or more banks of infrared heaters controlled as previously described. As used herein, the term "group" or "group of thermoplastic sheets" is defined to be at least two thermoplastic sheets but less than the plurality of thermoplastic sheets present in the pre-conditioning stage 14.

The processing temperature is an optimal temperature for subsequent processing within the forming stage 18. The processing temperature places the group of thermoplastic sheets in a malleable condition that is preferably a molten state. As used herein, the term "molten state" is defined as the condition of plastic elevated in temperature to a liquid state in which the plastic is formable, adaptable, pliable and capable of bonding by way of welding to a compatible material.

In one embodiment, the processing temperature is in a range between about 199 and 216 degrees Celsius. In other embodiments, the processing temperature may be higher or lower. In still other embodiments, the processing temperature of individual thermoplastic sheets within the group may be controlled to different temperatures to optimize subsequent processing in the forming stage 18.

The forming stage 18 may be any mechanism or device capable of forming the group of thermoplastic sheets into portions of the low permeation fuel tanks or other plastic containers. The forming stage 18 includes the capability to shape the group of thermoplastic sheets as well as capability to insert objects and join the group to form a container. Additional capabilities in other embodiments may include, for example, chemical treatment of the thermoplastic sheets, quality control, localized heating and/or cooling, material reallocation, applique and/or coatings. In addition, laminate applications and any other functionality pertaining to formation of the low permeation plastic fuel tanks or other containers may be included.

In one embodiment, the forming stage 18 uses the group of thermoplastic sheets and a mold to vacuum-form portions of the low permeation fuel tank. The mold may be two or more mold pieces with a surface(s) designed for contact with the group of thermoplastic sheets. The mold of one embodiment includes provisions for at least one mold insert. Mold inserts may be, for example, structural enhancements, externally mounted objects, objects penetrating one of the thermoplastic sheets in the group and/or any other object desirous to form part of the plastic container. The forming stage 18 may also include mold water heating and/or cooling, selective heating and/or cooling of portions of the mold, mechanical actuations or any other mold related functionality used in the thermoforming process.

Within the forming stage 18, the mold pieces are movable and may be separated to allow access to the surface(s) and facilitate insertion of objects. Objects, such as, for example, devices, structural components and/or connectors may be inserted and coupled with the group of thermoplastic sheets. Coupling with the group of thermoplastic sheets may include embedding the object in at least one of the thermoplastic sheets within the group, welding, gluing and/or any other mechanism for fixedly positioning the object with respect to at least one of the group of thermoplastic sheets. Exemplary coupling techniques are disclosed in a co-pending patent application entitled "ADAPTER FOR WELDING OBJECTS TO PLASTIC" Ser. No. 09/921,607 filed the same day as the present application, which is herein incorporated by reference in its entirety.

Following shaping and object insertion, the mold pieces are aligned and brought together. The mold pieces are brought together under considerable compressive loading to fuse the group of thermoplastic sheets and form a container. The thermoplastic sheets are fused to form a hermetic seal commonly referred to as a pinch off region. The resulting container is pressurized to fully conform the group of thermoplastic sheets to the mold pieces, encapsulate objects/mold pieces and improve finish and definition. In one embodiment, the complete container is the low permeation plastic fuel tank. In other embodiments, other types of containers may be formed.

The offloading stage 20 may be any mechanism or device capable of receiving the plastic container from the forming stage 18. The offloading stage 20 of one embodiment provides cooling and transferability of the low permeation plastic fuel tanks to other systems for final detailing and packaging.

During operation, thermoplastic sheets are deposited in the loading stage 12 and shuttled to the pre-conditioning stage 14. Within the pre-conditioning stage 14, the temperature of each of the thermoplastic sheets is uniformly increased under tightly controlled circumstances. Once the preprocessing temperature is reached, the thermoplastic sheets are uniformly maintained at that temperature until needed. Upon indication from the forming stage 18, a group of thermoplastic sheets are selected and shuttled to the final heat stage 16. In one embodiment, the group of thermoplastic sheets selected to enter the final heat stage 16 may be at the pre-processing temperature. In this embodiment, the temperature rapidly rises under tightly controlled conditions to the processing temperature. Once properly molten, the group of thermoplastic sheets is shuttled to the forming stage 18.

Within the forming stage 18, the group of thermoplastic sheets is independently formed to the mold pieces to create the walls of the plastic container. In addition, the thermoplastic sheets are formed to any mold inserts. Once the thermoplastic sheets are shaped, objects may be installed into the mold pieces and coupled with the molten walls. The mold pieces are then aligned and fused together under considerable force to form the hermetic seal. Upon separation of the mold pieces, the completed plastic container is shuttled to the offloading stage 20 to cool. The mold pieces are shuttled back to a start position. New mold inserts may be installed in the mold pieces, and indication is provided to the final heat stage 16 to select another group of thermoplastic sheets to heat to the processing temperature.

The heating operation of the pre-conditioning stage 14 takes significantly longer than processing by the final heat stage 16 and the forming stage 18. High volume production is achieved with these embodiments by minimizing the longer cycle time associated with heating the thermoplastic sheets within the pre-conditioning stage 14. Heating a large number of thermoplastic sheets in the pre-conditioning stage 14 minimizes the cycle time. The large number of thermoplastic sheets within the pre-conditioning stage 14 ensures a continuous supply of groups of thermoplastic sheets to the final heat stage 16 and the forming stage 18 at the pre-processing temperature.

High efficiency is achieved through parallel processing and accessibility during processing within the forming stage 18. Parallel processing of each thermoplastic sheet in the group of thermoplastic sheets within the final heat stage 16 and the forming stage 18 minimizes heat loss as well as processing delay. In addition, accessibility to the surface(s) of the mold and in-the-mold fusing techniques further improve efficiency by minimizing processing time and additional processing requirements.

Figure 2:
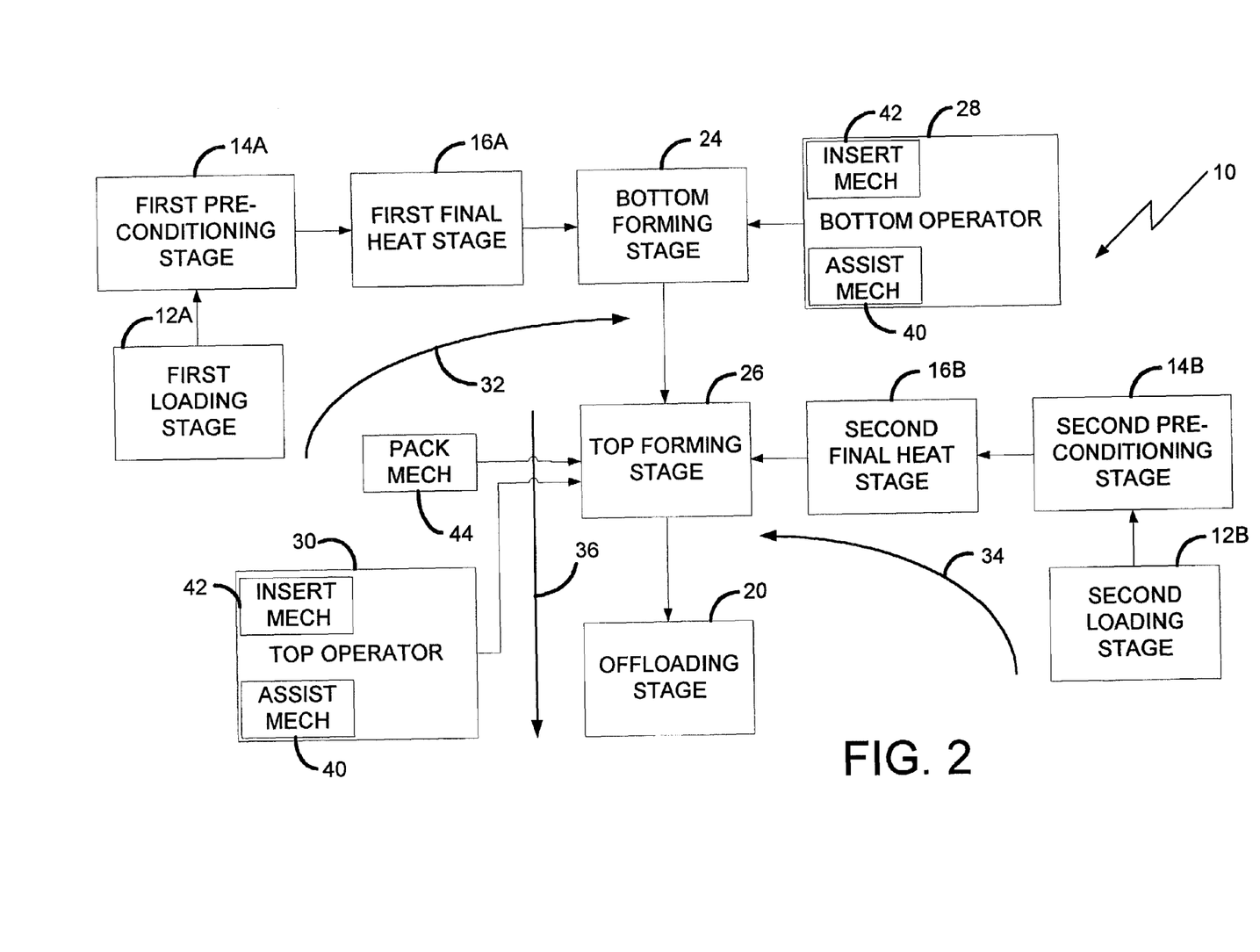
FIG. 2 is an expanded block diagram of one embodiment of the twin sheet parallel processing system illustrated in FIG. 1.

FIG. 2 is a block diagram of another embodiment of a twin sheet parallel processing system 10. The twin sheet parallel processing system 10 of this embodiment includes first and second loading stages 12a, 12b; first and second pre-conditioning stages 14a, 14b, first and second final heat stages 16a, 16b, a bottom forming stage 24, a top forming stage 26, a bottom operator 28, a top operator 30 and the offloading stage 20 operatively cooperating as illustrated. Similar to the previously discussed embodiments, this embodiment is capable of efficient, high volume, production of low permeation plastic fuel tanks.

The first and second loading stages 12a, 12b, the first and second pre-conditioning stages 14a, 14b and the first and second final heat stages 16a, 16b are similar in operation and functionality to the previously described loading stage 12, pre-conditioning stage 14 and final heat stage 16 illustrated in FIG. 1. Separation within the stages, however, provides distinct processing paths for the thermoplastic sheets.

The illustrated embodiment includes a first processing path indicated by arrow 32 and a second processing path indicated by arrow 34. The first processing path includes first loading stage 12a, pre-conditioning stage 14a, final heat stage 16a and the bottom forming stage 24. The second processing path similarly includes second loading stage 12b, pre-conditioning stage 14b, final heat stage 16b and the top forming stage 26. The first and second processing paths shuttle the thermoplastic sheets to a common processing path indicated by arrow 36.

As illustrated in FIG. 2, the common processing path begins in the top forming stage 26 and includes the offloading stage 20. In other embodiments, the common processing path may commence in the bottom forming stage 24. In still other embodiments, a common processing stage may be included to indicate commencement of the common processing path.

The bottom forming stage 24 may be any device or mechanism that includes at least one bottom mold piece forming the bottom half of the low permeation plastic fuel tank. Similar to the forming stage 18 discussed with reference to FIG. 1, the bottom forming stage 24 includes the capability to mold at least one thermoplastic sheet within the group of thermoplastic sheets. The bottom forming stage 24 also includes the capability to align with and transfer the bottom mold piece to the top forming stage 26. In other embodiments, alignment, and indication of alignment, may be performed by the top forming stage 26 or a combination of the bottom forming stage 24 and the top forming stage 26.

The top forming stage 26 may be any device or mechanism that includes at least one top mold piece forming the top half of the low permeation plastic fuel tank. The top forming stage 26 similarly includes the capability to mold thermoplastic sheets. In addition, the top forming stage 26 includes the capability to receive the bottom mold piece passed from the bottom forming stage 24. In another embodiment, the top forming stage 26 passes the top mold piece to the bottom forming stage 24.

In one embodiment, the top forming stage 26 also includes common processing. Common processing includes the capability to fuse the group of thermoplastic sheets as well as additional forming processes described later. In another embodiment, common processing is performed in the bottom forming stage 24.

Fusing during common processing couples the thermoplastic sheet(s) within the bottom mold piece with the thermoplastic sheet(s) in the top mold piece. In one embodiment, the bottom mold piece and the top mold piece are aligned and then brought together under significant pressure. In this embodiment, portions of the thermoplastic sheets within each of the mold pieces are pressed together to form a pinch-off region. Where multiple top and bottom mold pieces exist, the mold pieces may be selectively aligned and brought together to form a number of pinch-off regions.

Adjacent to the bottom and top forming stages 24, 26 are the bottom operator 28 and the top operator 30, respectively. The bottom and top operators 28, 30 may be any mechanisms or devices capable of assisting in forming the group of thermoplastic sheets to the respective mold pieces, inserting objects therein and fusing the group of thermoplastic sheets. In other embodiments, the bottom and top operators 28, 30 may include additional capability, such as, for example, spot heating and/or cooling, application of coating and laminates and welding or other similar coupling processes.

The bottom and top operators 28, 30 of one embodiment each include an assist mechanism 40 and an insertion mechanism 42. The assist mechanism 40 may be any device capable of urging the group of thermoplastic sheets to conform to a surface(s) of the bottom and top mold pieces. The group of thermoplastic sheets may be urged to conform to the mold surface(s) by, for example, conventional vacuum forming and/or plug assist devices.

Plug assist devices are well-known devices that aid in manipulating the group of thermoplastic sheets to maintain minimum sheet thickness during the forming process. Plug assist devices are particularly effective in the described embodiments due to the almost unlimited access to the contact between the surface(s) of the bottom and top mold pieces and the respective thermoplastic sheets. Effectiveness of the plug assist is also enhanced by the ability to perform the plug assist operation on each of the bottom mold piece and the top mold piece simultaneously thereby minimizing processing time, heat loss and process variations.

The insertion mechanism 42 may be a robot arm, a swing arm, a stamping device or any other movable device capable of positioning objects in contact with at least one thermoplastic sheet in the group of thermoplastic sheets. The insertion mechanism of one embodiment positions fuel system components in contact with the group of thermoplastic sheets before and/or after the sheets contact the bottom or top mold pieces. Fuel system components may include, for example, valves, hoses, pumps, encapsulated cam-locks, structural enhancements, sensors and other fuel system related mechanisms and features. Further detail regarding installation of fuel system components is disclosed in a co-pending patent application entitled "LOW HYDROCARBON EMISSION FUEL TANK WITH INTERNAL COMPONENTS" Ser. No. 09/921,541 filed the same day as the present application, which is herein incorporated by reference in its entirety.

Common processing within the top forming stage 26 also includes a packing mechanism 44. The packing mechanism 44 may be any device or mechanism to further assist in forming the group of thermoplastic sheets to the mold once the bottom and top mold pieces have come together. The packing mechanism 44 may be a separate stand-alone device or may be part of the bottom and top mold pieces.

In one embodiment, the packing mechanism 44 includes one or more needles and high-pressure fluid such as, for example, air, nitrogen or some other fluid. The needles puncture the group of thermoplastic sheets within the mold and inject the fluid under relatively high pressure. The relatively high pressure of one embodiment is between about 620 and 1103 KPa. The structural integrity of the bottom and top mold pieces are sufficient to accommodate the high-pressure fluid without failure or deformation. In addition, the bottom and top mold pieces remain together while the high-pressure fluid is applied.

The high-pressure fluid packs out and flows the molten group of thermoplastic sheets to fully encapsulate the surface(s) of the mold and any mold inserts. Following the encapsulation process, high volume and high velocity fluid, such as air, for example, is turbulently flowed through the mold to cool the formed group of thermoplastic sheets.

Figure 3:
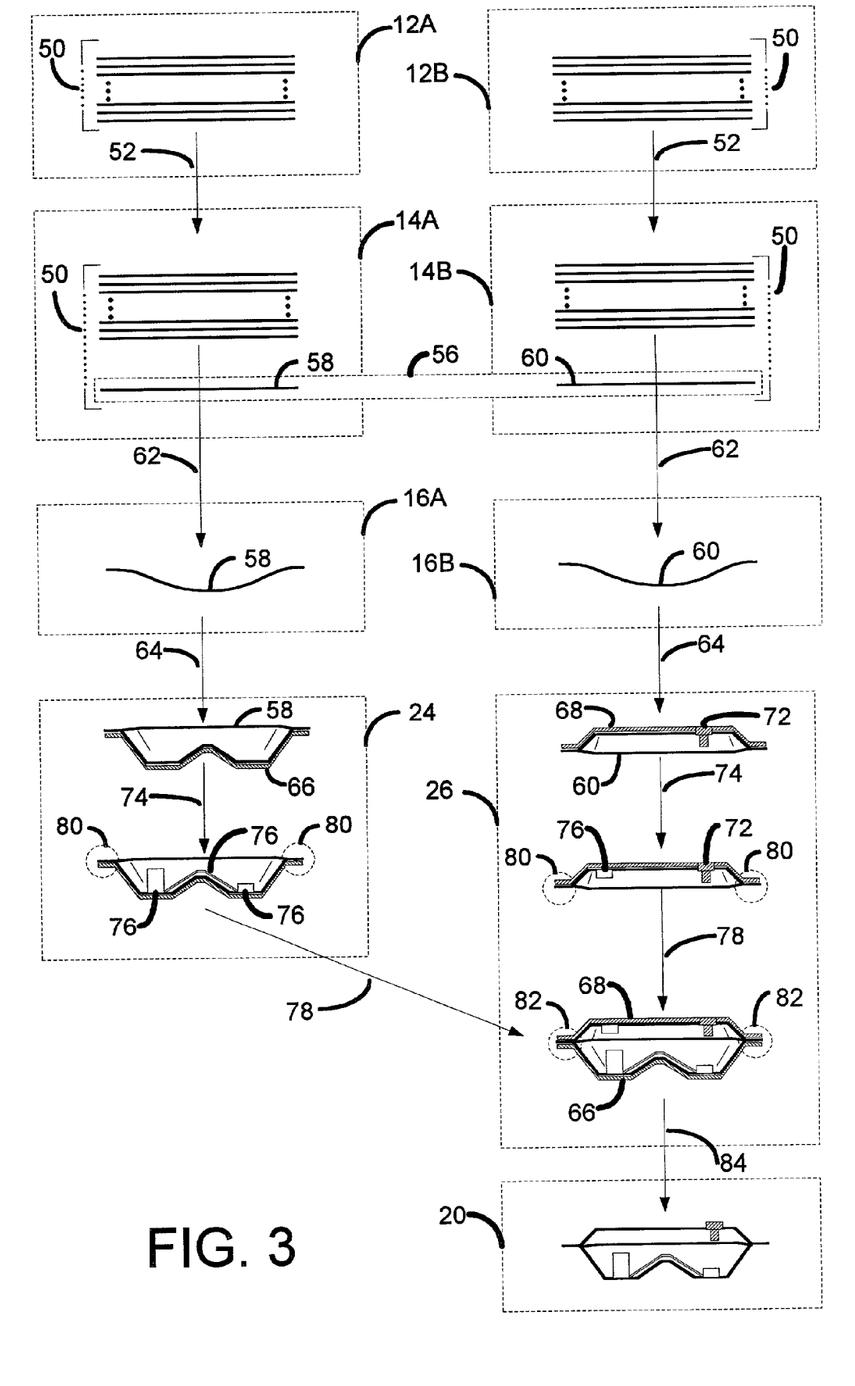
FIG. 3 is a process flow diagram illustrating operation of the twin sheet parallel processing system of FIG. 2.

FIG. 3 is a process flow diagram illustrating individual path processing and common path processing of the embodiment illustrated in FIG. 2. The operation begins when a plurality of thermoplastic sheets 50 (illustrated in a side view) are placed in first and second loading stages 12a, 12b. The thermoplastic sheets 50 are continuously, or intermittently, fed from the first and second loading stages 12a, 12b to the respective first and second pre-conditioning stages 14a, 14b as indicated by arrows 52. The first and second pre-conditioning stages 14a, 14b preheat the thermoplastic sheets 50 to the pre-processing temperature. In one embodiment, first and second pre-conditioning stages 14a, 14b heat the thermoplastic sheets 50 in a predetermined pattern to provide uniform heating without burning or degrading the thermoplastic sheets 50.

As illustrated in FIG. 3, a plurality of thermoplastic sheets 50 are heated in each of the pre-conditioning stages 14a and 14b at the same time. The thermoplastic sheets 50 include a group of thermoplastic sheets 56. In the illustrated embodiment, the group of thermoplastic sheets 56 includes a first thermoplastic sheet 58 and a second thermoplastic sheet 60. The first and second thermoplastic sheets 58, 60 are preferably heated to the preprocessing temperature and then indexed out of the respective pre-conditioning stages 14a and 14b as illustrated by arrows 62. The remaining thermoplastic sheets 50 continue heat soaking in pre-conditioning stages 14a, 14b to reach the pre-processing temperature.

Indexing may be accomplished with a sheet transfer system, such as, for example, a sheet clamp transfer system, a pin chain transfer system or any other system capable of transferring the first and second thermoplastic sheets 58, 60. The first and second thermoplastic sheets 58, 60 are moved into respective first and second final heat stages 16a, 16b for the final heating process. As the first and second thermoplastic sheets 58, 60 are indexed out, more thermoplastic sheets 50 may be indexed into pre-conditioning stages 14a, 14b to create a continuous flow-through production cycle.

The first thermoplastic sheet 58 and the second thermoplastic sheet 60 are shuttled in parallel from first and second pre-conditioning stages 14a, 14b. In one embodiment, the first and second thermoplastic sheets 58, 60 are heated quickly and at almost the same time to the processing temperature. In another embodiment, the heating of the first and second thermoplastic sheets 58, 60 is staggered slightly. Staggering provides uniformity in the time required for the first and second thermoplastic sheets 58, 60 to reach the processing temperature. Such staggering may be desirable when, for example, the first and second sheets 58, 60 have different thickness, heating requirements or heat retention properties.

The final stage of heating within first and second final heat stages 16a, 16b occurs in a relatively short period of time in comparison to the heating time in the first and second pre-conditioning stages 14a, 14b. As such, the temperature of the first and second thermoplastic sheets 58, 60 rapidly rises to the processing temperature. Upon heating to the processing temperature, such as, for example, a sagging state as illustrated in FIG. 3, the sheet transfer system operates. The sheet transfer system moves the first thermoplastic sheet 58 to the bottom forming stage 24, and the second thermoplastic sheet 60 to the top forming stage 26 as illustrated by arrows 64.

Within the bottom forming stage 24, the first thermoplastic sheet 58 is thermoformed to at least one bottom mold piece 66 with the bottom operator 28 (FIG. 2). At the same time, the second thermoplastic sheet 60 is thermoformed to at least one top mold piece 68 with the top operator 30 (FIG. 2). In the illustrative example depicted, a mold insert 72 is included in the top mold piece 68. It should be realized by the reader that the mold insert 72, the top and bottom mold pieces 66, 68 and respective first and second thermoplastic sheets 58, 60 are depicted in a cross sectional view within the bottom forming stage 24 and the top forming stage 26.

As indicated by arrows 74, the bottom and top operator stages 28, 30 (FIG. 2) may then couple at least one object 76 with the first thermoplastic sheet 58 and the second thermoplastic sheet 60. The bottom mold piece 66 is then aligned with the top mold piece 68 and the mold pieces are brought together in the top forming stage 26 as indicated by arrows 78.

The bottom and top mold pieces 66, 68 are brought together under a controlled closure position, speed and force profile. The process fuses the first thermoplastic sheet 58 with the second thermoplastic sheet 60 to form a hydrocarbon barrier. In one embodiment, the contact between the first thermoplastic sheet 58 and the second thermoplastic sheet 60 occurs on a lip 80 formed during thermoforming. The lip 80 circumferentially surrounds the periphery of the bottom and top mold pieces 66, 68 forming a continuous surface of thermoplastic. The lip 80 on the bottom mold piece 66 comes into contact with the lip 80 on the top mold piece 68 when the mold pieces are brought together. Since the lip 80 is molten thermoplastic, the speed, force and pressure are sufficient to create a pinchoff region 82 that forms the hydrocarbon barrier.

The packing mechanism 44 (FIG. 2) then operates to fully encapsulate the mold surfaces and the mold insert 72 with the first and second thermoplastic sheets 58, 60. In addition, the first and second thermoplastic sheets 58, 60, now forming the respective bottom and top halves of a container, are cooled by the packing mechanism 44. Following cooling, the bottom and top mold pieces 66, 68 are separated and the container is removed to the offloading stage 20 as indicated by arrow 84. The bottom and top mold pieces 66, 68 index back to a start position ready to receive another group of thermoplastic sheets from final heat stages 16a, 16b.

The container is cooled in the offloading station 20 and then off loaded for further processing. Further processing may include, for example deflashing. Deflashing is the process of removing excess thermoplastic material not necessary for proper operation of the container. Additional processing may also include, for example, an edge treatment applied to the pinchoff region 82 to enhance and maintain the hermetic seal and the hydrocarbon barrier. Exemplary edge treatments include sealants, chemical processing and/or additional fusion line sealing processes.

The previously discussed embodiments of the twin sheet parallel processing system 10 may be a continous cycle system capable of high volume production of plastic containers. High-volume capacity is achieved due in part to the nature of the heating techniques. Whereas prior art thermoforming systems use banks of infrared heaters to individually heat each thermoplastic sheet to the processing temperature, the previously discussed embodiments use the pre-conditioning stage 14 to preheat a plurality of thermoplastic sheets for maximum efficiency and throughput.

By maintaining a plurality of thermoplastic sheets that are heat soaked to the pre-processing temperature, heating to the processing temperature may occur at almost the same speed as the cooling process. As such, a significant bottleneck in the processing cycle is eliminated. Further, elimination of variations in the incoming temperature of the thermoplastic sheets eliminates detrimental process variations further improving quality and efficiency. Conversely, prior art infrared heaters are difficult to use for heat soak applications and are sensitive to variations in the incoming temperature of the thermoplastic sheets.

In addition, the twin sheet parallel processing system 10 is capable of producing low permeation plastic fuel tanks to comply with safety and performance standards. Internalization of fuel system components and use of multi-layer thermoplastic sheets lowers permeation and minimizes the potential for hydrocarbon emissions. Despite the robustness requirements of the thermoplastic sheets to comply with safety and performance standards, high volume and high efficiency production of low permeation plastic fuel tanks is achieved with the twin sheet parallel processing system 10. Further, the twin sheet parallel processing system 10 may be operated in parallel or inline with other related processes to further enhance volume and efficiency.

While the invention has been described above by reference to various embodiments, it will be understood that many changes and modifications can be made without departing from the scope of the invention. For example, the twin sheet parallel processing system 10 may handle more than one mold and corresponding group of thermoplastic sheets at the same time. It is therefore intended that the foregoing detailed description be understood as an illustration of the presently preferred embodiments of the invention, and not as a definition of the invention. It is only the following claims, including all equivalents that are intended to define the scope of this invention.

What is claimed is:

1. A method of high volume production of a low permeation plastic container, the method comprising:
   a) progressively heating by multi-stage convection a plurality of thermoplastic sheets to a first temperature;
   b) removing a group of thermoplastic sheets from the plurality of thermoplastic sheets;
   c) heating the group of thermoplastic sheets to a second temperature; and
   d) forming the group of thermoplastic sheets into a container after heating the group of thermoplastic sheets to the second temperature.

2. A method of high volume production of a low permeation plastic container, the method comprising:
   a) progressively heating a plurality of thermoplastic sheets in a multi-stage convection oven to a first temperature;
   b) removing a group of thermoplastic sheets from the plurality of thermoplastic sheets;
   c) heating the group of thermoplastic sheets to a second temperature; and
   d) forming the group of thermoplastic sheets into a container after heating the group of thermoplastic sheets to the second temperature.

3. The method of claim 1, wherein b) comprises selecting the group of thermoplastic sheets that have reached the first temperature.

4. The method of claim 1, wherein b) comprises progressively heating additional thermoplastic sheets to replace the group of thermoplastic sheets removed.

5. The method of claim 1, wherein c) comprises simultaneously heating each thermoplastic sheet in the group of thermoplastic sheets with an infrared heater.

6. The method of claim 1, wherein d) comprises coupling an object with at least one thermoplastic sheet in the group of thermoplastic sheets such that the object is positioned within the plastic container.

7. The method of claim 1, wherein d) comprises simultaneously vacuum-forming each thermoplastic sheet in the group of thermoplastic sheets to a surface of a mold.

8. The method of claim 1, wherein d) comprises fusing a lip formed with the group of thermoplastic sheets to form the container.

9. The method of claim 1, wherein a), b) and c) are occurring in parallel along a first processing path and a second processing path.

10. The method of claim 1, wherein d) is occurring along a common processing path.

11. A method for high volume production of a low permeation plastic fuel tank, the method comprising:
   a) progressively raising the temperature of a plurality of thermoplastic sheets to a pre-processing temperature in a multi-stage convection oven within a pre-conditioning stage;
   b) indexing at least two, but less than all, of the thermoplastic sheets to a final heat stage;
   c) further increasing the temperature of the at least two thermoplastic sheets to a processing temperature;
   d) indexing the at least two thermoplastic sheets to a forming stage;
   e) urging each of the at least two thermoplastic sheets into contact with a mold; and
   f) fusing the at least two thermoplastic sheets to form a plastic fue tank.

12. The method of claim 11, wherein the mold comprises a bottom mold piece and a top mold piece, and e) comprises urging one of the at least two thermoplastic sheets into contact with the bottom mold piece and urging another of the at least two thermoplastic sheets into contact with the top mold piece.

13. The method of claim 11, wherein a) comprises indexing additional thermoplastic sheets into the pre-conditioning stage to replace the at least two thermoplastic sheets.

14. The method of claim 11, wherein a) comprises minimizing variability in the temperature of each of the thermoplastic sheets.

15. The method of claim 11, wherein a) comprises maintaining the thermoplastic sheets at the pre-processing temperature.

16. The method of claim 11, wherein d) comprises simultaneously indexing the at least two thermoplastic sheets to the forming stage.

17. The method of claim 11, wherein f) comprises in ecting high-pressure fluid into the mold to pack out the at least two thermoplastic sheets.

18. The method of claim 11, wherein e) comprises coupling a fuel system component with at least one of the at least two thermoplastic sheets such that the fuel system component is positioned within the plastic fuel tank.

19. The method of claim 11, wherein the length of time to raise the thermoplastic sheets to the pre-processing temperature is longer than the length of time to raise the at least two thermoplastic sheets to the processing temperature.

20. The method of claim 11, wherein a) comprises heating in a predetermined pattern to uniformly raise the temperature of each of the thermoplastic sheets.

* * * * *